(12) United States Patent
Duprey (10) Patent No.: US 7,746,875 B1
(45) Date of Patent: ***Jun. 29, 2010

(54) SYSTEM AND METHOD FOR PROTECTING AND SHARING DATA ACROSS A NETWORK

(75) Inventor: Dennis Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/019,696

(22) Filed: Dec. 21, 2004

(51) Int. Cl.
*H04L 12/28* (2006.01)
(52) U.S. Cl. .................... 370/401; 370/422
(58) Field of Classification Search ......... 370/216–228, 370/254–258, 351, 389, 400–401, 422; 707/200, 707/202, 203, 204; 711/114, 162; 714/1, 714/2, 6, 15, 19, 100; 709/217, 219
See application file for complete search history.

(56) References Cited

U.S. PATENT DOCUMENTS

| | | | | |
|---|---|---|---|---|
| 5,748,896 A | * | 5/1998 | Daly et al. | 709/223 |
| 5,754,782 A | * | 5/1998 | Masada | 709/213 |
| 6,360,330 B1 | | 3/2002 | Mutalik et al. | |
| 6,460,055 B1 | * | 10/2002 | Midgley et al. | 707/204 |
| 6,526,418 B1 | * | 2/2003 | Midgley et al. | 707/204 |
| 6,662,187 B2 | * | 12/2003 | Barnett et al. | 707/101 |
| 6,708,227 B1 | * | 3/2004 | Cabrera et al. | 719/328 |
| 6,898,681 B2 | * | 5/2005 | Young | 711/162 |
| 6,976,066 B1 | * | 12/2005 | Mouhanna et al. | 709/223 |
| 7,054,892 B1 | | 5/2006 | Phillips et al. | |
| 7,139,887 B2 | * | 11/2006 | Colgrove et al. | 711/162 |
| 7,177,921 B2 | * | 2/2007 | Taguchi | 709/220 |
| 7,469,269 B2 | | 12/2008 | Klein et al. | |
| 7,469,294 B1 | * | 12/2008 | Luo et al. | 709/229 |
| 2001/0051996 A1 | * | 12/2001 | Cooper et al. | 709/217 |
| 2002/0141387 A1 | * | 10/2002 | Orshan | 370/352 |
| 2003/0149869 A1 | * | 8/2003 | Gleichauf | 713/153 |
| 2005/0185597 A1 | * | 8/2005 | Le et al. | 370/254 |
| 2005/0197859 A1 | * | 9/2005 | Wilson et al. | 705/2 |
| 2006/0004830 A1 | * | 1/2006 | Lora et al. | 707/102 |
| 2006/0031468 A1 | | 2/2006 | Atluri et al. | |

* cited by examiner

*Primary Examiner*—Hong Cho
(74) *Attorney, Agent, or Firm*—Krishnendu Cupta; Joseph D'Angelo (57) ABSTRACT

This invention is an architecture, system, method, program product, licensing method, or apparatus for sharing and protecting data in a data storage environment, wherein there is more than one site for data storage and a connection broker is used.

20 Claims, 7 Drawing Sheets

SYSTEM AND METHOD FOR PROTECTING AND SHARING DATA ACROSS A NETWORK

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally data protection for users of computers, and more specifically to methods, systems, apparatus, and an architecture for such data protection.

RELATED APPLICATION

This application is a related to co-pending U.S. patent application Ser. No. 10/905,197 entitled "An Architecture for Protecting and Sharing Data across a Network" by Duprey, filed on even date, and is assigned to EMC Corporation, the same assignee as this invention. This application is also related to co-pending U.S. patent application Ser. No. 11/019,700 entitled "A Method for Licensing Services for Protecting and Sharing Data across a Network" by Duprey, filed on even date, and is assigned to EMC Corporation, the same assignee as this invention.

BACKGROUND OF THE INVENTION

Data storage has figuratively speaking, over the years, been managed in islands, especially for home users or small private businesses. Meanwhile, the complexity and amount of data being used and stored by home users is growing significantly especially with the popularity of digital imaging from still and video cameras. In such environments, there has typically been no resource sharing or centralized management among these islands.

If a home user, or a small business suffers a crashed hard disk or other data storage failure than precious irreplaceable data could be lost forever. Backing up some data to plug-in devices may provide some protection but it is limited because a calamity such as a fire at the home can destroy the device also. The costs of offsite data protection used by large businesses such as remotely located redundant storage arrays is prohibitively expensive for home users and typically also for small businesses. But, it would advance the art to provide a system, method, and/or architecture that would overcome such and related problems in an economically attractive fashion.

SUMMARY OF THE INVENTION

To overcome the problems of the prior art mentioned above and to provide advantages also described above, this invention is a system in one embodiment, a method in another, an apparatus in another, and a program product in still another embodiment.

In one embodiment, the invention is implemented as steps in a process. In other embodiments, implementations include a computer program product, or an apparatus, wherein each embodiment is configured for carrying out the steps involved in the methodology. In still another embodiment architecture is implemented as an embodiment for pooling storage resources and enabling the methodology embodiments of the invention. Still another embodiment is a method of licensing services for sharing and protecting data.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. When the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Overview

The inventor has critically recognized the need for protecting data for those unable to afford expensive solutions that large businesses may use. Accordingly, the broadest overview of the invention includes a system, method, apparatus, program product, and/or architecture for cooperative data protection and sharing.

In one embodiment, a cooperative data protection and data sharing methodology is employed that includes a connection broker, license manager, and share site database for enabling protection and sharing at so-called "share sites." A high-bandwidth or broadband data channel, such as via a cable-modem or DSL, is preferably employed to handle large amounts of data traffic being shared and protected.

Generally, in, for example, a popular Microsoft Windows-based environment, a user selects folders to protect and/or share. Sensitive data may optionally be encrypted on a share site, e.g. financial data related to banking, taxes, and the like. Family pictures and movies and other types of digital images can be shared. When data is transferred it is preferably encrypted and sent over a broadband connection from one share site to one or more others, which provides sharing and also protection because it spreads the data to other sites thereby decreasing vulnerability.

Changed files may be copied to another share site each night, or on some other periodic basis. A user using software involved in employing the sharing and protection methodology may restrict how much data can be stored on their site. The protection may simultaneously provide protection against hardware or software failures, viruses, and other types of data vulnerabilities.

Figure 2:
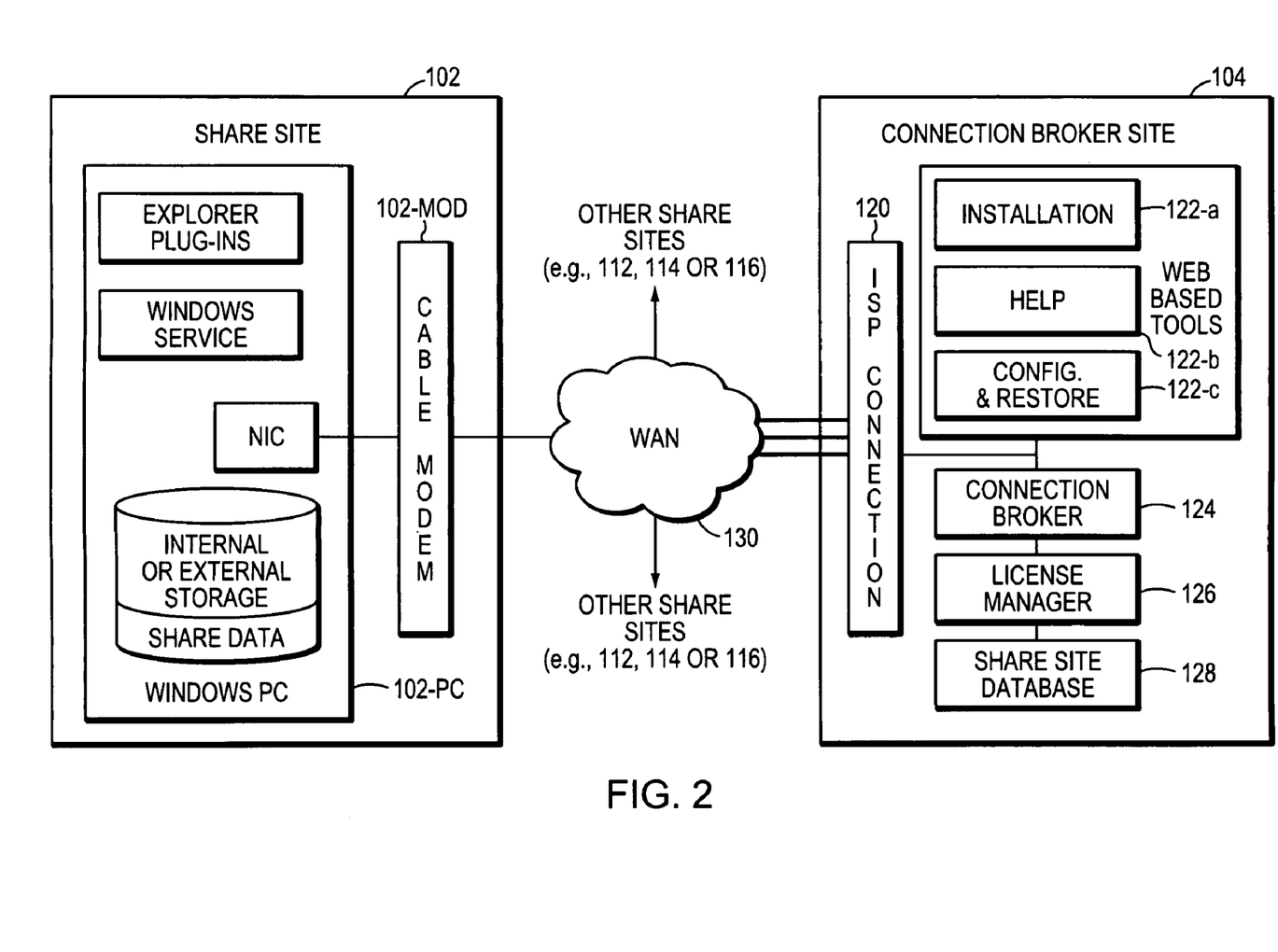
FIG. 2 is a block diagram of components of the architecture of FIG. 1 useful for data protection including program logic useful for enabling method embodiments of this invention.

Software for providing such protection and sharing may be available to one wanting to participate via web download, CD-ROM, or other form of distribution. In a preferred embodiment it is via web download from a connection broker site (FIG. 2). Such software could also be made available with purchase of a digital camera, of which there are roughly 23 million and growing each year. Probably the majority of digital cameras archive their photos and other images on home computers, and these users are in need of the data protection and/or sharing provided by this invention.

Regarding the need for such a methodology, architecture, software, apparatus, and system provided by this invention, the inventor has critically recognized that broadband reached a major milestone in the year 2004: 100 million subscribers globally. Since subscribers typically include residential and business accounts, the actual number of users is far greater, roughly 250 million, and increasing each year. Therefore there is a long-felt need for an invention that allows data sharing and/or protection.

A wizard-type installation may be loaded from a web server. Such a preferred wizard can validate license key, install any plug-in (e.g. Windows-based plug ins) and any required service software, registers product and with a product manufacturer or distributor or service provider. Then software upgrades can be enabled over the web in on a periodic or as-needed basis.

Embodiments

Figure 1:
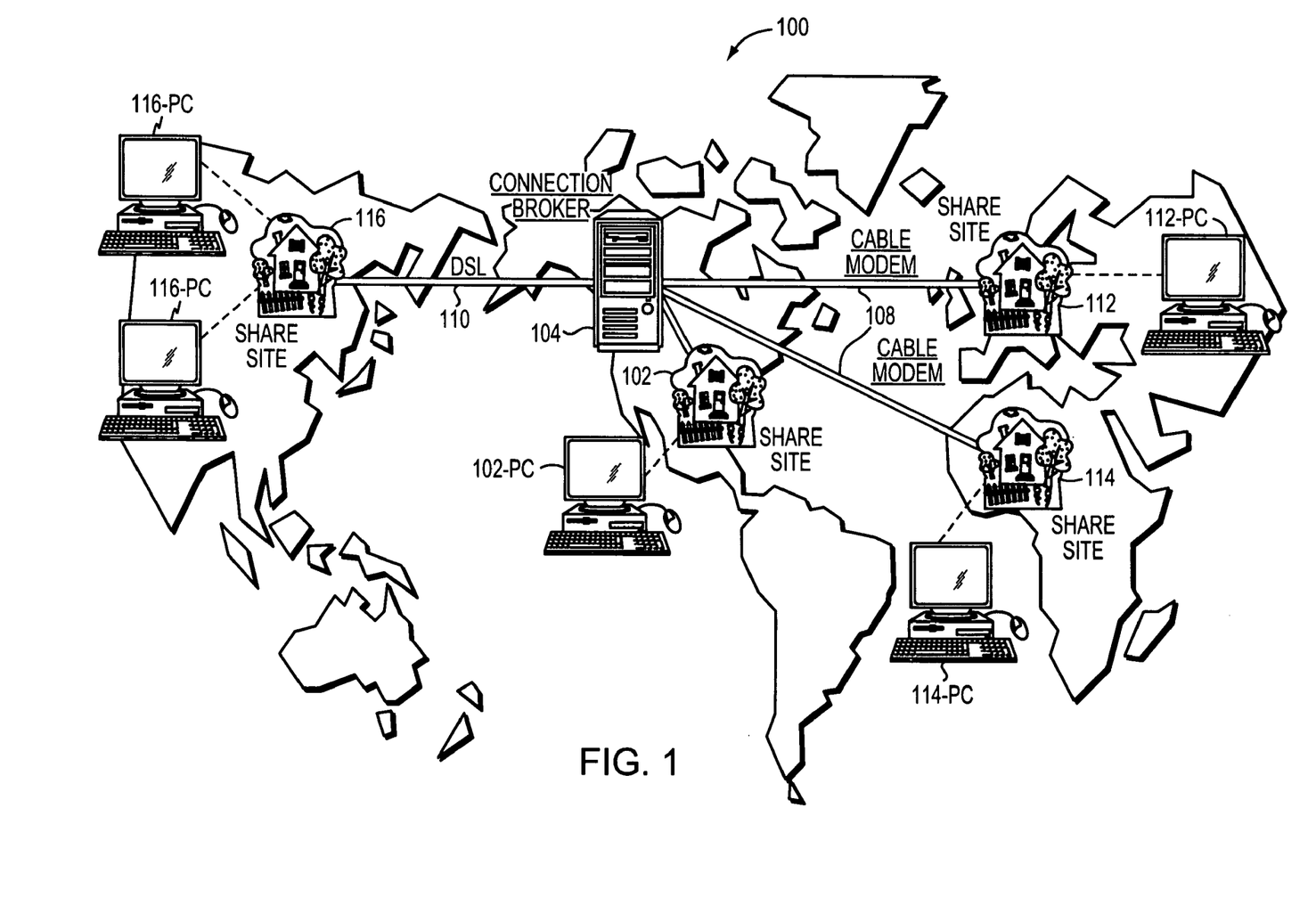
FIG. 1 is a schematic of an architecture useful for data protection.

Referring to FIG. 1, a globally distributed data storage environment 100 is shown, including share sites 102, 112, 114, and 116. Each share site includes one or more Personal Computers (PC's), respectively 102-PC, 112-PC, 114-PC, and more than one 116-PC. Various communication medium protocols and technologies may be used to communicate among the share sites, including DSL 110, Cable Modems 108 and others not shown. A connection broker 104 is used to communicate with and manage the various share sites, and more detail about this is given in FIG. 2.

Referring to FIG. 2, a network cloud 130 serves as a communication hub between share sites and connection broker site 104. The connection broker site 104 includes an internet service provider (ISP) connection 120 that communications with logic modules, which in a preferred embodiment are software and preferably are web-based tools. An installation module 122-a is useful for installing new share sites, a help module 122-b is for helping installation, use, or service. A connection broker 124 module operates preferably locally to manage sharing communications; a license manager 126 governs licensing and uses a share site database 128 for such governance.

On a typical share site, such as the shown site 102, a cable modem or other similar type of device or software for accessing the internet is provided in communication with the 102-PC itself. This PC includes various software modules including plug-ins for a browser, such as Internet Explorer (Microsoft) or other Microsoft Windows Operating System services communication module for communicating with the cable modem. Also included is internal or external storage and data to be shared.

Figure 3:
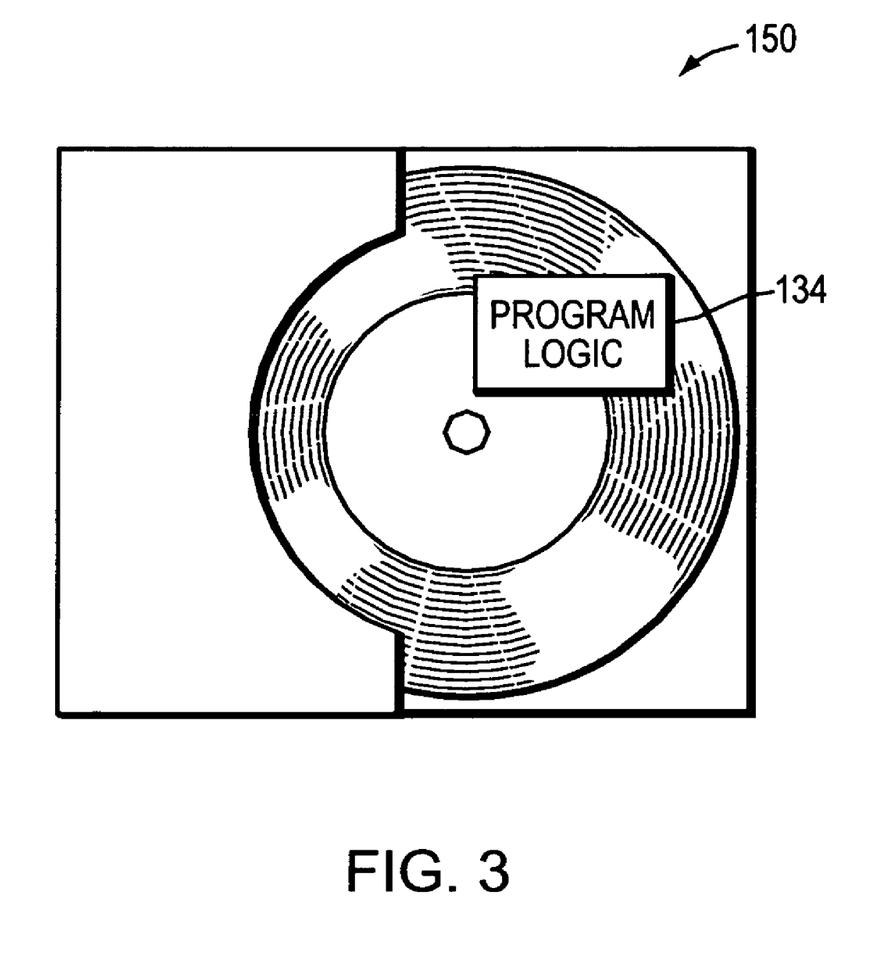
FIG. 3 shows a computer-readable medium including computer-executable code including program logic for carrying out method steps of the method embodiments of the present invention.

Referring to FIG. 3, a computer-readable medium 150 including computer-executable code including program logic 134 for carrying out method steps of the method embodiments of the present invention is shown. The logic may include software that enables functions provided by software on the connection broker site and a share site, or portions thereof.

Methodology

Figure 4:
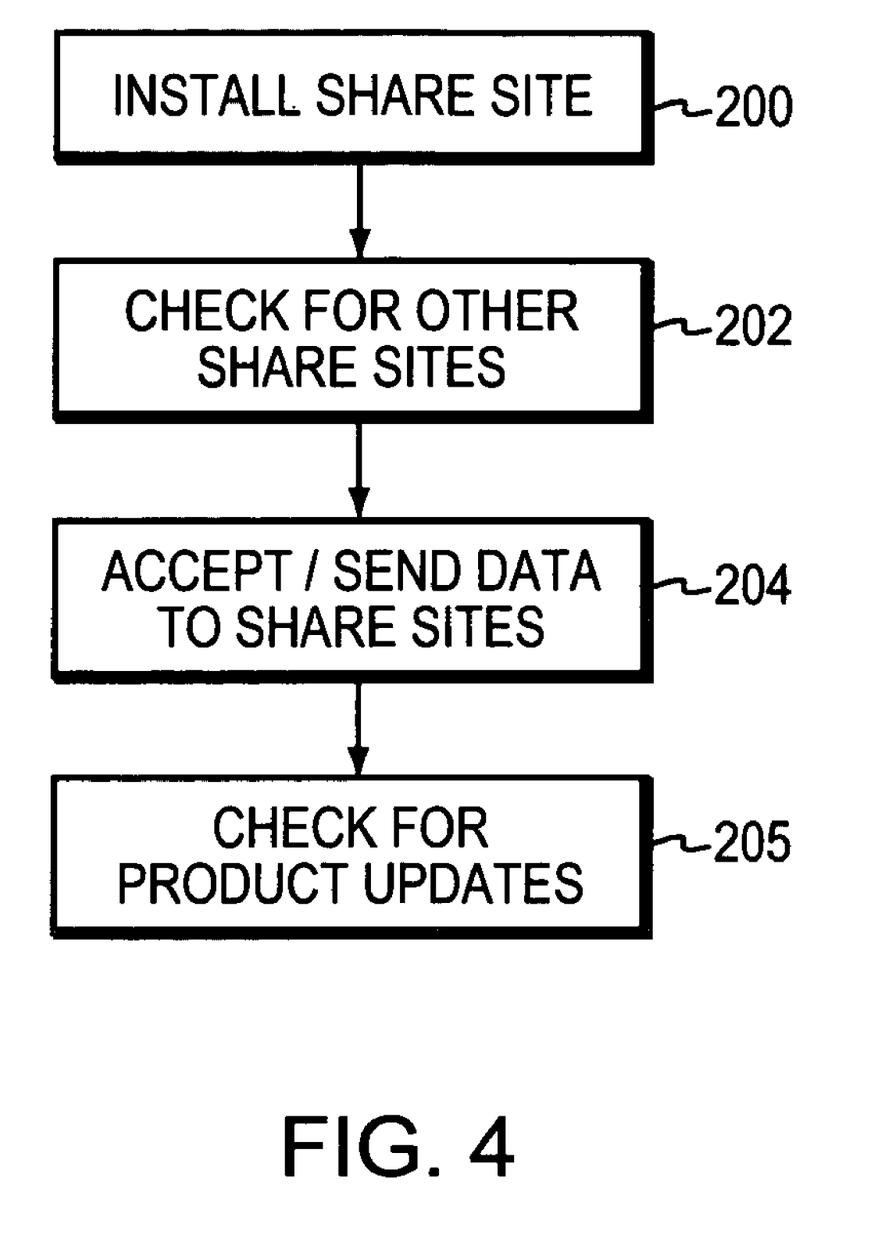
FIG. 4 is a flow logic diagram useful for carrying out method embodiments of this invention.

Referring to FIG. 4, a flow logic diagram illustrating methodology of the present invention is shown. A share site is installed in step 200. Then a check for other share sites is done in step 202. Accepting or sending data to share sites is done next in step 204. Checking for product updates is next in step 205. Software upgrades can be done through the preferred Windows interface, remotely or by the user on-site. Initial configuration and identification of any share sites are set up during install, but may be added or revised later on as-needed basis. One skilled in the art will recognize that the invention is not limited to pairs or coupling of one share site to another but could be embodied as n-way or bi-directional configurations. Nevertheless, for the sake of simplicity, pairs are illustrated in example embodiments described herein.

Figure 5:
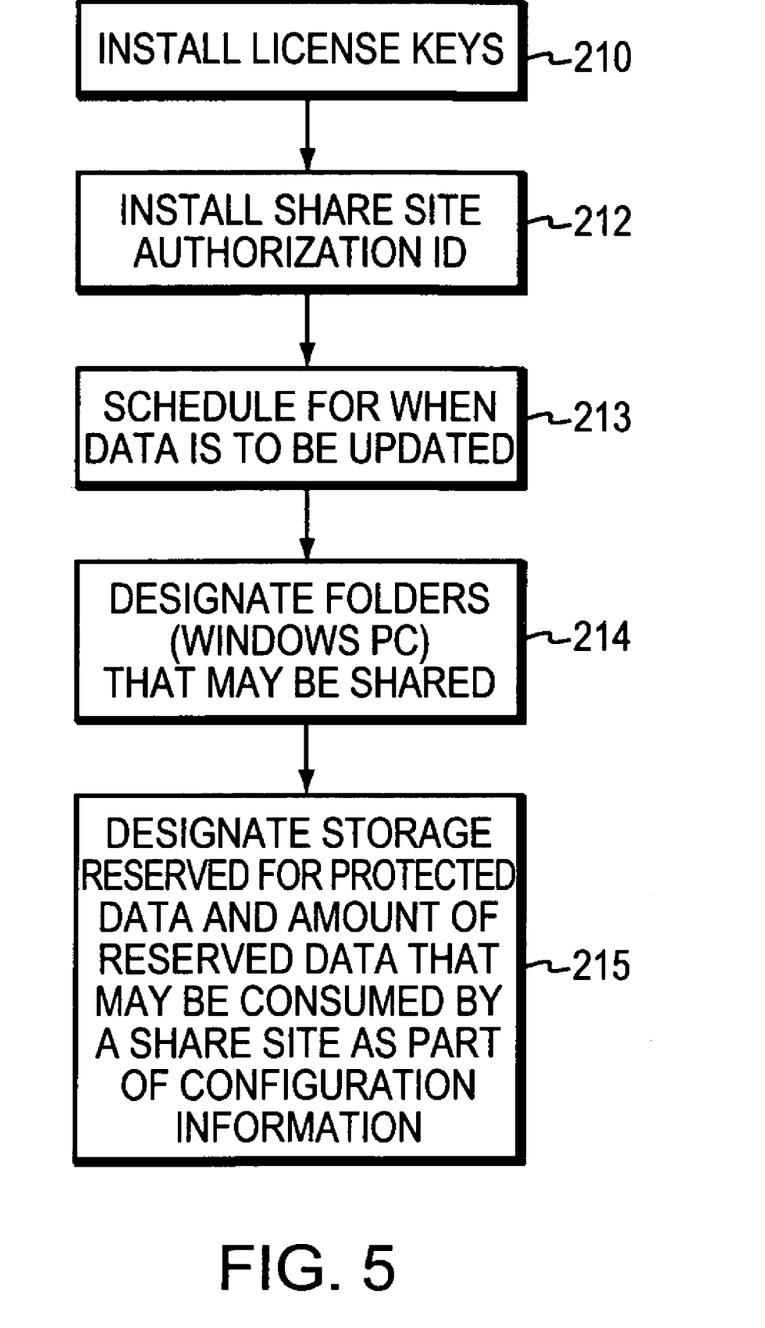
FIG. 5 is another flow logic diagram useful for carrying out method embodiments of this invention.

Referring to FIG. 5, another flow logic diagram illustrating methodology of the present invention is shown. License keys are installed in step 210. Then a share site authorization ID is done in step 212. A schedule for when data is to be updated to the share site is specified in step 213. Folders (preferred MS Windows-based PC) are designated for sharing in step 214. A user may protect or unprotect a folder to indicate whether its status is private or shared. Configuration information, e.g. update schedule information, folders, reserved storage, space limits and authorization id's may be maintained in a database such as the Windows registry and replicated or copied on each share site. Also storage reserved for protecting shared data may be configured in step 215 and the amount of storage that may be consumed can be allocated in this step as configuration information.

Figure 6:
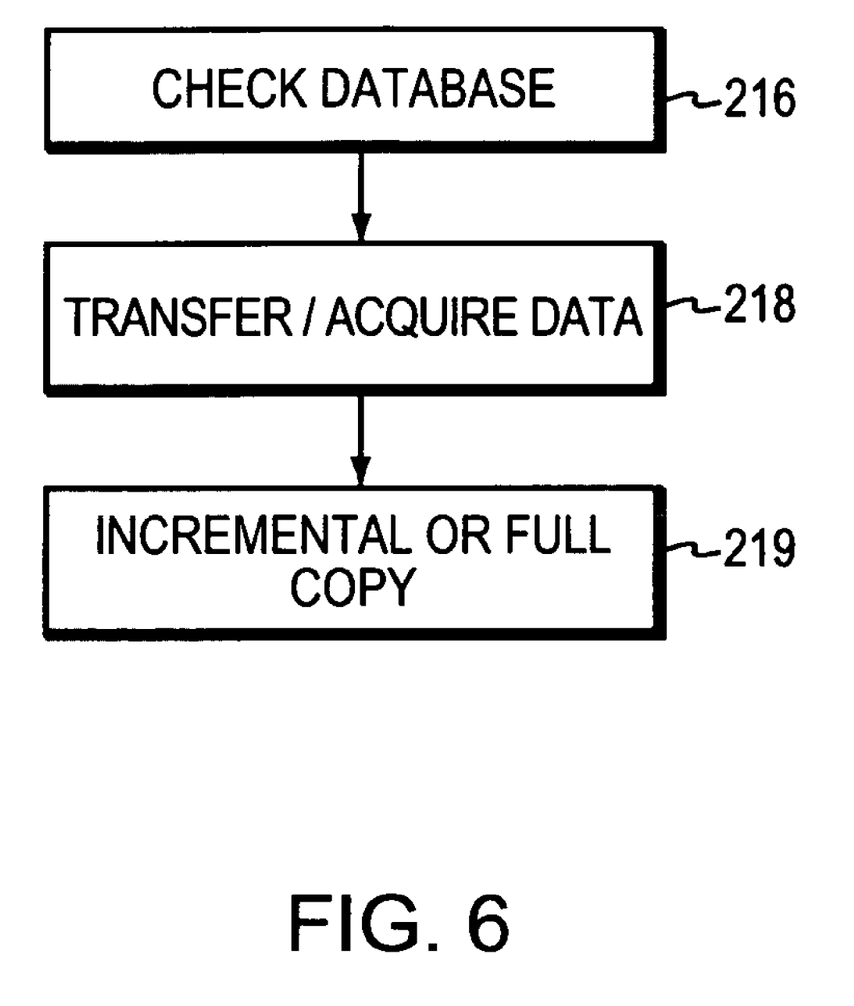
FIG. 6 is another flow logic diagram useful for carrying out method embodiments of this invention.

Referring to FIG. 6, another flow logic diagram illustrating methodology of the present invention is shown. The database is checked in step 216 to establish a network connection to broker 124. Preferably when two sites are paired for sharing, each opens a connection to the broker and data passes through the broker site, but this is only an example of one implementation. In step 218, a transfer or acquisition of data for security measures. An incremental or full copy can then be done to get the data from the source share site to the target share site in step 219.

Figure 7:
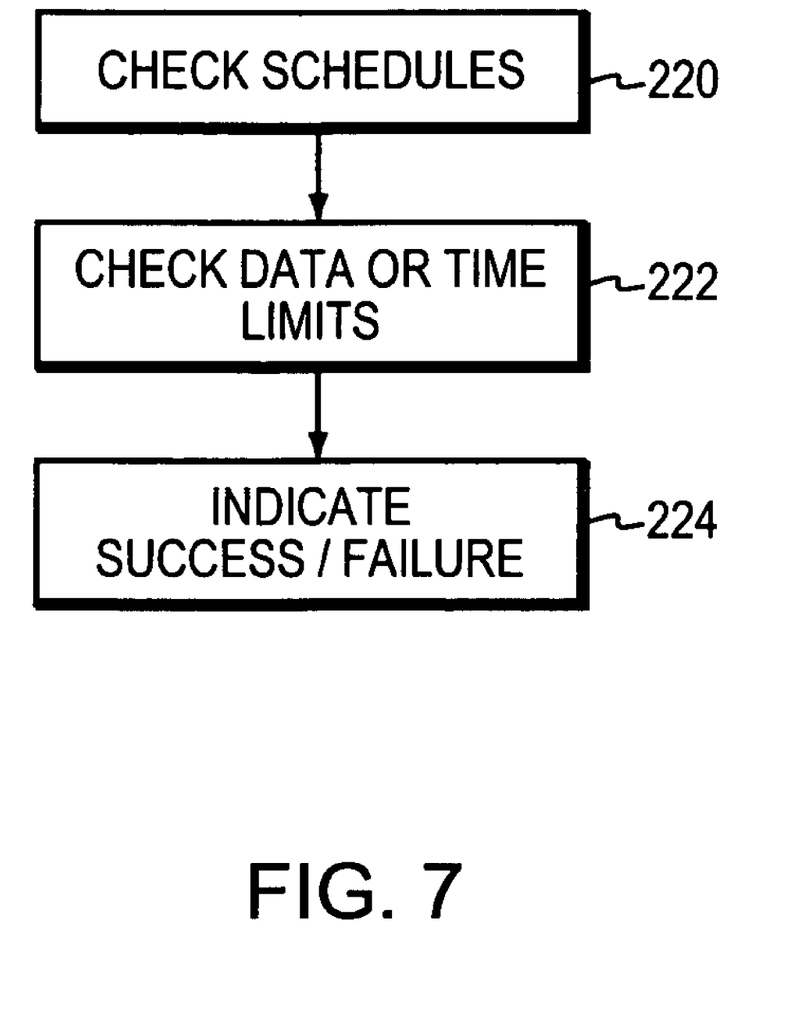
FIG. 7 is another flow logic diagram useful for carrying out method embodiments of this invention.

Referring to FIG. 7, another flow logic diagram illustrating methodology of the present invention is shown. The schedule is checked in step 220, and a check of data or time limits is done in step 222. The schedule may indicate, for example, the time to start a data share and/or protect step. Also indicated may be the amount of data allowed to be shared, which may be limited by the amount that the share site is set to be able to receive (configured in step 215). Finally, upon completion an indication of success or failure (or other) status is given in step 224.

The connection broker may be used to connect share sites by using the TCP/IP protocol. The broker enforces license restrictions and ensures that authorized sites are connected (i.e., it checks the authorization ID's from both sites to ensure the data goes to the designated sites). It is preferred that it be based on a internet-based application, and may be used for making configuration changes, on-line help, and controlling of data restores from a share site.

Such a restore will be used to put in action the protection function that is enabled by using a share site. If data is lost at the original site it can be restored from the site, or sites that originally received its data. For example, a user may have lost data representing digital images of precious family photos.

In a preferred environment, Product updates may be integrated into Windows update notification/installation mechanism. Changed files may be copied at preconfigured times or based on an event such as a downloading of images from a digital camera. Updates may be based on file time last modified and list of what is at share site. Data may be encrypted before transfer, which may be important for sensitive information or even digital images. Data may be encrypted before transfer, and optionally may remain encrypted at the share site, so that it remains private yet is available if needed for a restore. Any encryption keys that are used are saved on the source share site only.

In Windows-based embodiment, a callout balloon on a task bar may be used for alerting status of data copy. For example, a data transfer may indicate as successful and the time given or a message of failure may be given, e.g. "unable to reach share site—contact site!" Or for example, another message may appear, such as "maximum allowed data size exceeded—contact share site."

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for sharing and protecting data storage in a data storage environment including a network, the method comprising:

using a connection broker site to communicate with a plurality of data share and protect sites; wherein the connection broker site includes a share site database providing information about share and protect sites including the plurality of data share and protect sites; wherein license keys are installed on the share sites and share site authorization ids are installed and used to authenticate the share sites; wherein the connection broker site includes a module for restoration of data on a first of the plurality of the data share and protect sites from data copied from a first of the plurality of the data share and protect sites to a second of the plurality of the data share and protect site; wherein storage reserved for protected data and amount of reserved data may be designated during the setting of configuration information; wherein folders may be designated to be shared between the share sites; wherein a schedule for when data is updated is designated; and wherein data is copied from at least one of the plurality of data share and protect sites to at least one other of the plurality of the data share and protect sites; and wherein the connection broker site includes a license manager that is configured to restrict which of the plurality of data shares and protect sites can connect to ensure authorized sites are connected.

2. The method of claim 1, wherein at least one of the plurality of data share and protect sites includes a cable modem.

3. The method of claim 1, wherein the connection broker site includes a module for installation of a share and protect site.

4. The method of claim 1, wherein the connection broker communicates with the plurality of data share and protect sites across a wide area network.

5. The method of claim 4, wherein the wide area network operates in accordance with an internet protocol.

6. The method of claim 5, wherein the wide area network accommodates broadband connections between the connection broker site and any one of the plurality of data share and protect sites.

7. The method of claim 6, wherein the connection broker site includes a module for configuration of one of the plurality of data share and protect site.

8. A system for sharing and protecting data in a data storage environment including a network, the system comprising:

a plurality of data share and protect sites; wherein data is copied from at least one of the plurality of data share and protect sites to at least one other of the plurality of the data share and protect sites; and a connection broker site including a license manager and in communication with the plurality of data share and protect sites; wherein license keys are installed on the share sites and share site authorization ids are installed and used to authenticate the share sites; wherein the connection broker site includes a share site database providing information about share and protect sites including the plurality of data share and protect sites; wherein storage reserved for protected data and amount of reserved data may be designated during the setting of configuration information; wherein folders may be designated to be shared between the share sites; wherein a schedule for when data is updated is designated; and wherein the connection broker site includes a module for restoration of data on a first of the plurality of the data share and protect sites from data copied from a first of the plurality of the data share and protect sites to a second of the plurality of the data share and protect site; and computer-executable program code on the license manager capable of restricting which of the plurality of data share and protect sites can connect to ensure authorized sites are connected.

9. The system of claim 8, wherein at least one of the plurality of data-share and protect sites includes a cable modem.

10. The system of claim 8, wherein the connection broker site includes a module for installation of a share and protect site.

11. The system of claim 8, wherein the connection broker communicates with the plurality of data share and protect sites across a wide area network.

12. The system of claim 11, wherein the wide area network operates in accordance with an internet protocol.

13. The system of claim 12, wherein the wide area network accommodates broadband connections between the connection broker site and any one of the plurality of data share and protect sites.

14. The system of claim 13, wherein the connection broker site includes a module for configuration of a share and protect site.

15. A program product for sharing and protecting data in a data storage environment including a network and in the network a plurality of data share and protect sites and a connection broker site including a license manager in communication with the plurality of data share and protect sites, the program product comprising:

a computer-readable medium encoded with computer-executable program code enabling restriction of which of the plurality of data share and protect sites can connect to ensure authorized sites are connected;

wherein computer-executable program code enables the connection broker site to include a share site database providing information about share and protect sites including the plurality of data share and protect sites; wherein license keys are installed on the share sites and share site authorization ids are installed and used to authenticate the share sites; and wherein computer-executable program code enables restoration of data on a first of the plurality of the data share and protect sites from data copied from the first of the plurality of the data share and protect sites to the a second of the plurality of the data share and protect sites; wherein storage reserved for protected data and amount of reserved data may be designated during the setting of configuration information; wherein folders may be designated to be shared between the share sites; wherein a schedule for when data is updated is designated.

16. The computer product of claim 15, wherein the connection broker site includes a module for installation of a share and protect site.

17. The computer product of claim 15, wherein the connection broker communicates with the plurality of data share and protect sites across a wide area network.

18. The computer product of claim 15, wherein the wide area network operates in accordance with an internet protocol.

19. The computer product of claim 15, wherein the wide area network accommodates broadband connections between the connection broker site and any one of the plurality of data share and protect sites.

20. The computer product of claim 15, wherein the connection broker site includes a module for configuration of one of the plurality of data share and protect site.

* * * * *